United States Patent [19]

Oden et al.

[11] Patent Number: 4,745,390

[45] Date of Patent: May 17, 1988

[54] FOUR-WHEEL DRIVE ENGAGEMENT DETECTOR

[76] Inventors: Michael A. Oden, 31,145 All View Dr., Running Springs, Calif. 92382; Darrell B. Oden, 1184 E. 27th St., San Bernardino, Calif. 92404

[21] Appl. No.: 7,782

[22] Filed: Jan. 28, 1987

[51] Int. Cl.$^4$ ............................................. B60Q 1/00
[52] U.S. Cl. ............................... 340/52 R; 340/52 D; 340/672; 340/686; 340/687; 180/247; 192/30 W
[58] Field of Search ................. 340/52 R, 52 D, 52 F, 340/669–672, 686, 687; 180/247, 248, 249, 251, 297; 74/752 A, 740; 192/30 W

[56] References Cited

U.S. PATENT DOCUMENTS

| | | | |
|---|---|---|---|
| 3,728,676 | 4/1973 | Brown | 340/672 |
| 4,200,816 | 4/1980 | Hopkins | 340/672 |
| 4,340,133 | 7/1982 | Blersch | 340/686 |
| 4,664,217 | 5/1987 | Welch et al. | 180/247 |

*Primary Examiner*—Donnie L. Crosland
*Attorney, Agent, or Firm*—Gene W. Arant; Matthew F. Jodzuewicz

[57] ABSTRACT

In a four wheel drive vehicle wherein unintended engagement of the first driving axle during vehicle use will result in damage to the vehicle drive train, an apparatus for sensing and indicating the status of the front driving axle without requiring the vehicle occupants to stop the vehicle and perform a visual inspection of the vehicle drive train including, in combination, a drive train shaft that rotates whenever the front driving axle of the vehicle is engaged in four wheel drive and a permanent magnet fixedly secured to the drive train shaft. Magnetically activated relay means, such as a reed switch, are operatively connected to a battery in the vehicle and to an illumination means for switching the illumination means on and off. The relay means are fixedly attached to a stationary portion of the vehicle at a location so that as the magnet rotates with the drive train shaft, it interacts with the relay means to alternatively energize the illumination means whenever the magnet is proximate the relay means and de-energize the illumination means whenever the magnet is remote from the relay means. A counterbalance means are fixedly secured to the drive train shaft opposite the magnet for providing a stabilizing counterweight to the out-of-line torque forces produced by the magnet as it rotates on the drive train shaft.

9 Claims, 3 Drawing Sheets

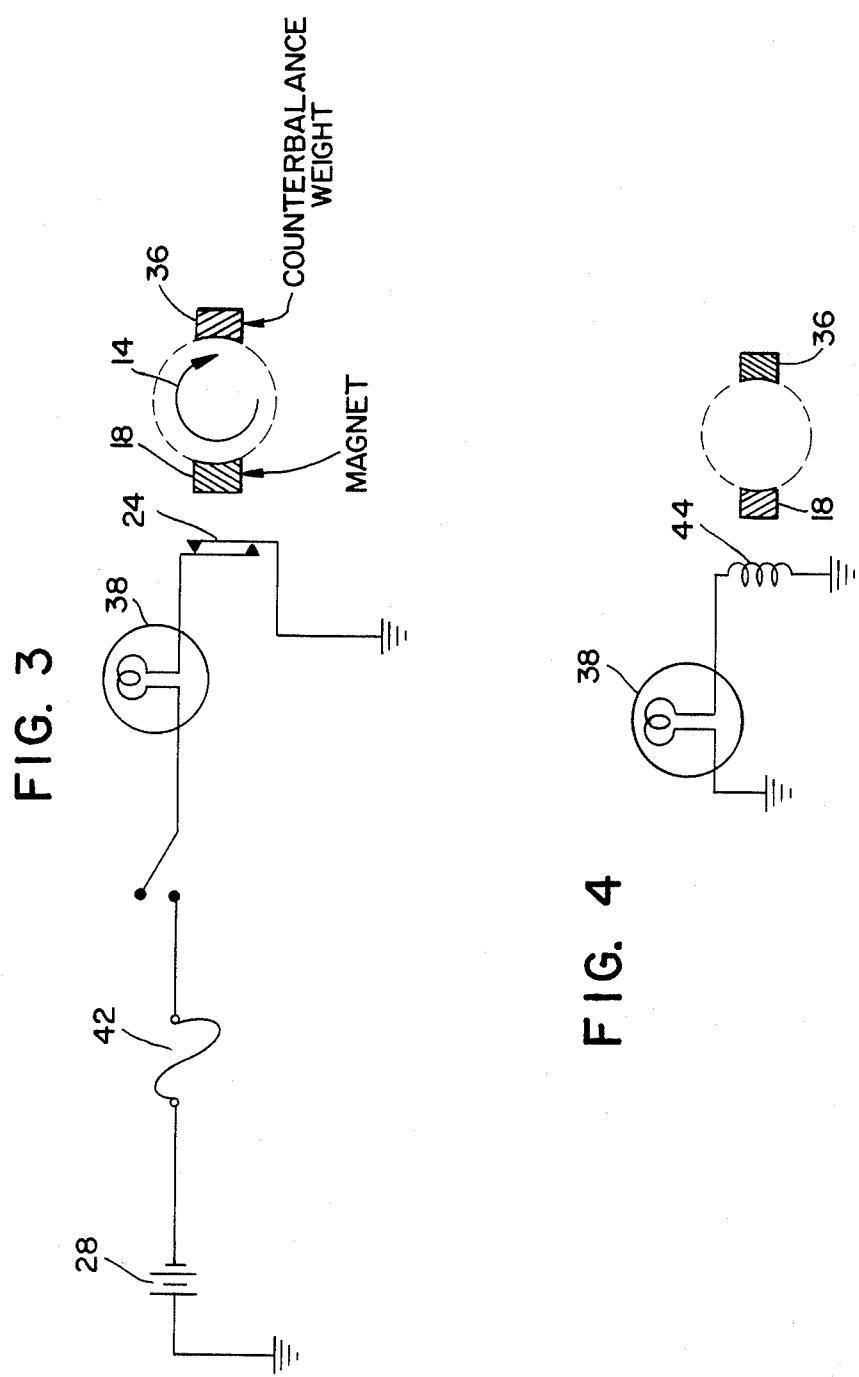

FOUR-WHEEL DRIVE ENGAGEMENT DETECTOR

BACKGROUND OF THE INVENTION

1. Field of the Invention

This invention relates in general to motion detecting devices; and, more particularly, in a four wheel drive vehicle wherein unintended engagement of the front driving axle during vehicle use will result in damage to the vehicle drive train, an apparatus for sensing and indicating the status of the front driving axle without requiring the vehicle occupants to stop the vehicle and perform a visual inspection of the vehicle drive train.

2. Description of the Related Art

The four-wheel drive vehicle was developed toward the end of World War II to meet a special goal. The military found that working in loose traction terrain with heavy payloads meant getting stuck with great frequency and certainty. This was especially true with a conventional, single axle that allowed a truck to bury its axle while the rear wheels spun their way to the netherworld.

One of the solutions to this problem was to employ a pulling front axle with a pushing rear axle. Thus was born the first four-wheel drive vehicle.

In general terms, a four-wheel drive vehicle incorporates a solid, hypoid drive with turning knuckles for steering. The steering knuckles are examples of mechanical complexity due to the fact that a flexible axle shaft joint, a sealed lubrication method and a drive mechanism to the wheel hub are required for four-wheel drive.

To distribute the power from the engine to the wheels, transfer cases and power dividers acting as gearboxes are used in the drive train system. Although some recent advances in four-wheel drive systems attempt to use automatic transmission-type planetary gearsets and chain drive mechanisms, the vast majority of existing and manufactured four-wheel drive vehicles remain all gear linked, from the transmission, through the transfer case, to the axle assemblies.

Most four-wheel drive vehicles are dual purpose utility vehicles. Driven daily on the street or long stretches over paved highways, they perform just like the ordinary two-wheel-drive vehicle. Unless the vehicle encounters terrain that requires four-wheel drive for traction, such as ice, loose gravel or snow, the transfer case of the vehicle drive train remains disengaged and the vehicle remains in two-wheel drive. It is when the driver of the vehicle requires four-wheel drive from the vehicle that a manual activation of the transfer case is made and the vehicle shifts into four-wheel drive.

The shift from two-wheel drive to four-wheel drive usually does not call for stopping the vehicle.

The most important requirement in operating a vehicle with a four-wheel drive is that the four-wheel drive must never be used on a hard, dry surface. The front axle will work against the rear, without slippage, especially on turns, and the result would be binding of the geartrain pieces and the damage of internal geartrain components.

A limited slip differential mechanism may be developed to provide a limited amount of slip to compensate for the speed variance between the front and rear axles. Any such mechanism would, however, continue to apply relatively heavy power to both axles. Enough power to cause the steering of the vehicle to swing back and forth in tight, slow turning maneuvers. This power would also creat unnecessary load on U-joints, gears and bearings. It remains then that inadvertent engagement and operation of a four-wheel drive vehicle in its four-wheel drive mode on dry or hard pavement would cause major damage to the vehicle drive train.

This problem sometimes exists because the transfer case remains "gear bound" even after the driver has attempted to disengage the front drive shaft.

The present invention provides an apparatus for sensing and indicating the status of the front driving axle, or any axle, without requiring the vehicle occupants to stop the vehicle and perform a visual inspection of the vehicle drive train. Consequently, the present invention provides the driver with a warning indicator that enables him to shift from four-wheel drive mode prior to damaging the vehicle drive train.

SUMMARY OF THE INVENTION

It is an object of the present invention to provide an apparatus for sensing and indicating the status of the front driving axle in a four-wheel drive vehicle without requiring the vehicle occupants to stop the vehicle and perform a visual inspection of the vehicle drive train.

It is another object of the present invention to provide an apparatus for sensing and indicating the status of the front driving axle in a four-wheel drive vehicle so that the driver may be able to shift from four-wheel drive mode to two-wheel drive mode prior to damaging the vehicle drive train.

It is yet another object of the present invention to provide an apparatus for sensing and indicating the status of the front driving axle in a four-wheel drive vehicle that is relatively maintenance free, easy to install and economical in construction.

In summary, the present invention finds its main use in a four wheel drive vehicle wherein unintended engagement of the front driving axle during vehicle use will result in damage to the vehicle drive train, and provides an apparatus for sensing and indicating the status of the front driving axle without requiring the vehicle occupants to stop the vehicle and perform a visual inspection of the vehicle drive train. An apparatus constructed in accordance with the present invention includes, in combination, a drive train shaft that rotates whenever the front driving axle of the vehicle is engaged in four wheel drive and a permanent magnet fixedly secured to the drive train shaft. Magnetically activated relay means, such as a reed switch, are operatively connected to a battery in the vehicle and to an illumination means for switching the illumination means on and off. The relay means are fixedly attached to a stationary portion of the vehicle at a location so that as the magnet rotates with the drive train shaft, it interacts with the relay means to alternatively energize the illumination means whenever the magnet is proximate the relay means and de-energize the illumination means whenever the magnet is remote from the relay means. A counterbalance means are fixedly secured to the drive train shaft opposite the magnet for providing a stabilizing counterweight to the out-of-line torque forces produced by the magnet as it rotates on the drive train shaft.

An alternative apparatus constructed in accordance with the invention for use in a four wheel drive vehicle wherein unintended engagement of the front driving axle during vehicle use will result in damage to the vehicle drive train, for sensing and indicating the status of the front driving axle without requiring the vehicle occupants to stop the vehicle and perform a visual inspection of the vehicle drive train, includes, in combination a drive train shaft that rotates whenever the front driving axle of the vehicle is engaged in four wheel drive and a permanent magnet fixedly secured to the drive train shaft. Inductor means are operatively connected to an illumination means and to a stationary portion of the vehicle at a location so that as the magnet rotates with the drive train shaft, it alternately induces an electrical current in the inductor means sufficient to activate the illumination means whenever the source of magnetic flux is proximate the inductor means and does not so interact with the inductor means to induce an electrical current therein sufficient to activate the illumination means whenever the magnet is remote from the inductor means. A counterbalance means is fixedly secured to the drive train shaft opposite the magnet for providing a stabilizing counterweight to the out-of-line torque forces produced by the magnet as it rotates on the drive train shaft.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

BRIEF DESCRIPTION OF THE DRAWINGS

FIG. 3 is a schematic drawing of a circuit embodying the present invention; and

FIG. 4 is a schematic drawing of an alternate circuit embodying the present invention.

DESCRIPTION OF THE PREFERRED EMBODIMENTS

A preferred embodiment of an apparatus constructed in accordance with the present invention as it would be utilized in connection with a four-wheel drive vehicle, will now be described with reference being made to the drawings.

Figure 1:
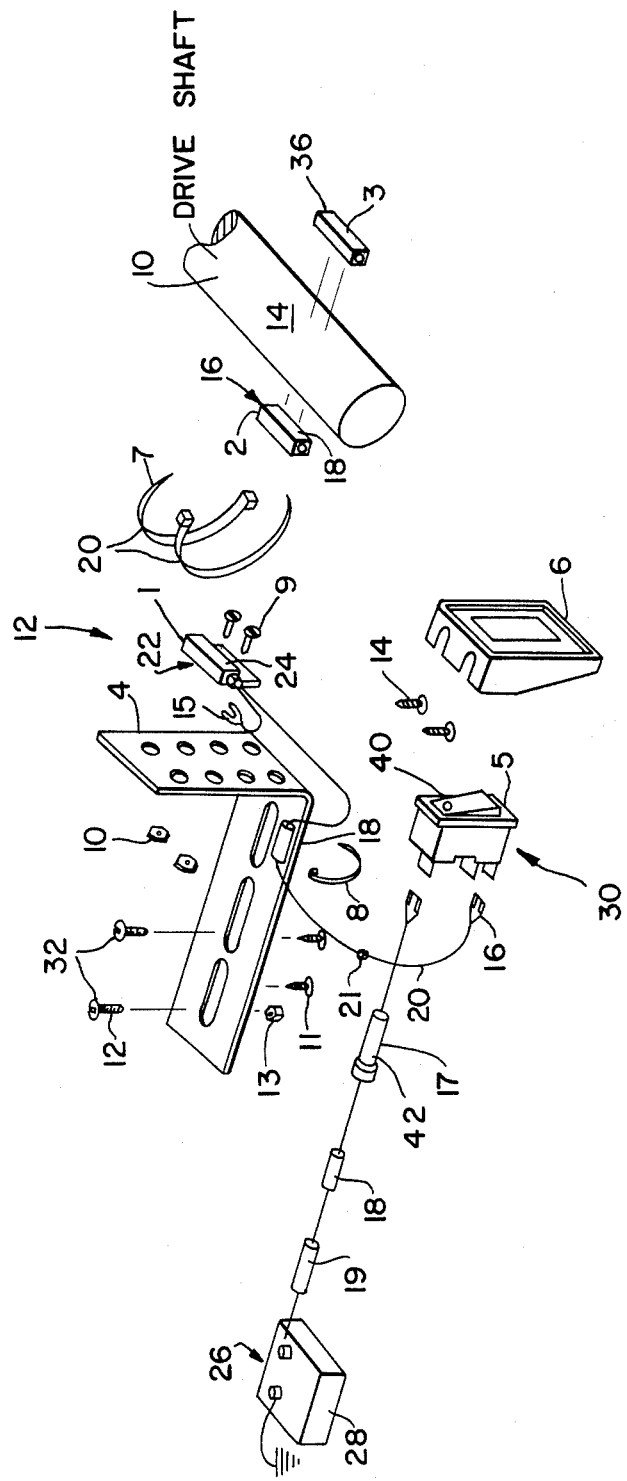
FIG. 1 is an exploded view of an apparatus embodying the present invention showing an idealized use of the apparatus.
Figure 2:
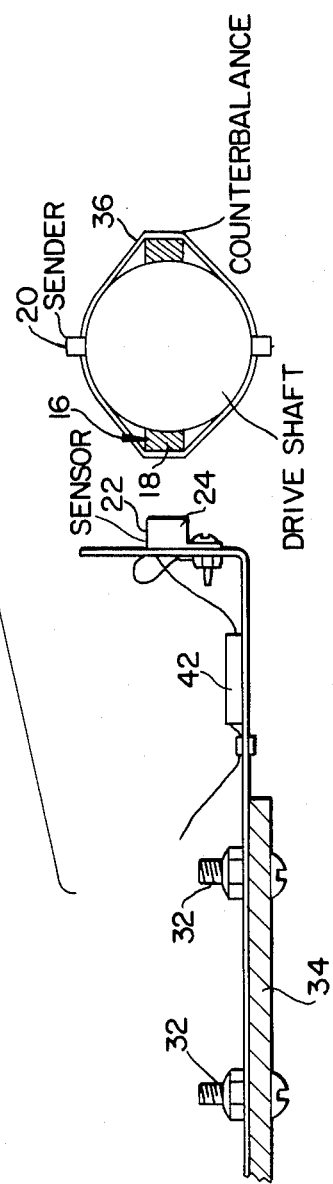
FIG. 2 is a partial cross section showing the placement of the sensor means of the present invention with regard to the drive train shaft being monitored.

Specifically, with reference to FIGS. 1, 2, and 3, in a four wheel drive vehicle wherein unintended engagement of the front driving axle 10 during vehicle use will result in damage to the vehicle drive train, an apparatus 12 for sensing and indicating the status of the front driving axle 10 without requiring the vehicle occupants to stop the vehicle and perform a visual inspection of the vehicle drive train, includes, in combination, a drive train shaft 14 that rotates whenever the front driving axle 10 of the vehicle is engaged in four-wheel drive. Drive train shaft 14 can be any of the drive train shafts providing drive power to the wheels normally powered only when the vehicle is in four-wheel drive mode.

A source of magnetic flux 16, preferably a permanent magnet 18, is fixedly secured by tie straps 20 to the drive train shaft 14 chosen for monitoring.

A magnetically activated relay means 22, such as a reed switch 24, is operatively connected to a source of electromotive energy 26. In a vehicle, source 26 would preferably be a vehicle battery 28. Relay means 22 is also operatively connected to an illumination means 30 for switching the illumination means 30 on and off.

Relay means 22 is fixedly attached by a nut and bolt combination 32 to a stationary portion 34 of the vehicle at a location so that as the magnet 18 rotates with the drive train shaft 14, it interacts with the relay means 22 to alternatively energize the illumination means 30 whenever the magnet 18 is proximate the relay means 22, and de-energize the illumination means 30 whenever the magnet 18 is remote from the relay means 22.

A counterbalance means 36 is fixedly secured to the drive train shaft 14 by tie straps 20 opposite the magnet 18 for providing a stabilizing counterweight to the out-of-line torque forces produced by the magnet 18 as it rotates on the drive train shaft 14.

Illumination means 30 is preferably either an electric bulb 38 or a light emitting diode 40.

A fusing element 42 is operatively connected between the battery 28 and the illumination means 30 to provide circuit protection for current surges or short-circuits that may develop while the apparatus 12 is in use.

An alternative embodiment of an apparatus for use in a four wheel drive vehicle wherein unintended engagement of the front driving axle during vehicle use will result in damage to the vehicle drive train, for sensing and indicating the status of the front driving axle without requiring the vehicle occupants to stop the vehicle and perform a visual inspection of the vehicle drive train, is similar in construction to that described immediately above and is shown in schematic form in FIG. 4. Specifically, with reference being made to FIGS. 1, 2, and 4, where similar elements to those described immediately above are shown (such similar elements identified by similar reference numerals superscripted with a prime), the alternate apparatus 12' includes, in combination, a drive train shaft 14' that rotates whenever the front driving axle 10' of the vehicle is engaged in four-wheel drive.

A source of magnetic flux 16', preferably a permanent magnet 18', is fixedly secured to the drive train shaft 14' by tie straps 20'.

Inductor means 44', which is preferably a wound coil of conductive wire, is operatively connected to an illumination means 30'. Inductor means 44' is fixedly attached by a nut and bolt combination 32' to a stationary portion 34' of the vehicle at a location so that as the magnet 18' rotates with the drive train shaft 14', it alternately induces an electrical current in the inductor means 44' sufficient to activate the illumination means 30' whenever the source of magnetic flux 16' is proximate the inductor means 44' and does not so interact with the inductor means 44' to induce an electrical current therein sufficient to activate the illumination means 30' whenever the magnet 18' is remote from the inductor means 44.

A counterbalance means 36' is fixedly secured to the drive train shaft 14' opposite the magnet 18' for providing a stabilizing counterweight to the out-of-line torque forces produced by the magnet 18' as it rotates on the drive train shaft 14'.

Illumination means 30' is preferably, as before, either an electric bulb 38' or a light emitting diode 40'.

The operation of the above described preferred embodiments of an apparatus constructed in accordance with the present invention would be as follows:

While driving the vehicle in four-wheel drive mode, the illumination means 30 will flash as the front driving axle 10 and drive train shaft 14 turn. As speed increases to approximately 25 miles per hour, the flashing of the illumination means 30 will also increase to a point where it is so rapid that the bulb 38 or light emitting diode 40 will appear to wobble or glow dimly. This is the normal indication of engagment of the front driving axle 10 in the four-wheel drive mode.

When the vehicle is being driven in the two-wheel drive mode, the front driving axle 10 and drive train shaft 14 will be stationary and the indicator light of the illumination means 30 will not flash. Depending on the position of the magnet 18 with respect to the relay means 22 or to the inductor means 44', the indicator light of the illumination means 30 will be either "on" or "off", but not flashing when the drive train is generally stationary.

If the indicator light of the illumination means 30 is still flashing after the vehicle has been placed into two-wheel drive mode, it indicates that the front driving axle 10, and consequently one or both of the front hubs, is still engaged, or else the transfer case is "gear bound". This is a warning to the vehicle driver to retry the disengagement procedure several times in an attempt to resolve the problem. If the disengagement is not successful, as indicated by the indicator light of the illumination means 30, and after checking the front wheel hubs it is found that they are in fact unlocked, the vehicle should be cautiously driven directly to a mechanic or a knowledgeable individual for service.

While in two-wheel drive mode in some vehicles the front driving axle and drive shaft may turn slowly (especially at highway speeds) due to normal friction and/or wind drag on the drive train system. This will cause the indicator light of the apparatus of the present invention described above to flash intermittantly, but this does not indicate either a problem with the apparatus of the present invention or that the vehicle is in four-wheel drive mode. The driver can easily ascertain this condition with a little experience.

The invention described above is, of course, susceptible to many variations, modifications and changes, all of which are within the skill of the art. It should be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

What is claimed is:

1. In a four-wheel-drive vehicle having a transfer case, a first drive shaft normally operable for driving a first pair of wheels, and a second drive shaft selectively engageable through the transfer case for driving a second pair of wheels;

a retrofittable detection and alarm apparatus for indicating to the vehicle driver, without his leaving the driver's compartment, that the second shaft is inadvertently operating; said detection and alarm apparatus comprising, in combination:

(a) a permanent magnet positioned on said second shaft at a location remote from the transfer case;

(b) a counterbalance weight disposed adjacent to said permanent magnet but on the opposite side of said second shaft;

(c) strap means removably securing both said magnet and said counterbalance weight to said shaft;

(d) a rack disposed adjacent said second shaft at said location and removably attached by nuts and bolts to the frame of the vehicle;

(e) a magnetically activated reed switch relay supported from said rack adjacent to said permanent magnet;

(f) an illumination means mounted in the driver's compartment; and (g) electric circuit means connected to the vehicle battery and connecting said relay and said illumination means in a series loop circuit so that rotation of said second drive shaft is visibly indicated by a periodic flashing of said illumination means on and off;

the operation being such that at relatively low vehicle speeds the flashing of said illumination means is clearly visible, and if the driver succeeds in disengaging said second drive shaft while the vehicle is in motion, said illumination means then assumes a fixed condition of operation and thereby indicates that success.

2. Apparatus as in claim 1 which additionally includes a protective fuse supported upon said rack and connected into said series loop circuit.

3. The apparatus of claim 1 wherein said illumination means is an electric bulb.

4. The apparatus of claim 1 wherein said illumination means is a light emitting diode.

5. In a four-wheel-drive vehicle having a transfer case, a first drive shaft normally operable for driving a first pair of wheels, and a second drive shaft selectively engageable through the transfer case for driving a second pair of wheels;

a retrofittable detection and alarm apparatus for indicating, regardless of the assumed state of the transfer case, whether the second shaft is nevertheless inadvertently operating, so that the driver may observe that problem and disengage said second shaft without leaving the driver's compartment, said detection and alarm apparatus comprising, in combination:

(a) a permanent magnet positioned on said second shaft at a location remote from the transfer case;

(b) a counterbalance weight disposed adjacent to said permanent magnet but on the opposite side of said second shaft;

(c) fastening means removably securing both said magnet and said counterbalance weight to said shaft;

(d) a rack disposed adjacent said second shaft at said location and removably secured to the frame of the vehicle;

(e) a magnetically activated relay supported from said rack adjacent to said permanent magnet;

(f) an illumination means mounted in the driver's compartment; and (g) electric circuit means connected to the vehicle battery and connecting said relay and said illumination means in a series loop circuit so that rotation of said second drive shaft is visibly indicated by a periodic flashing of said illumination means on and off;

the operation being such that at relatively low vehicle speeds when said second drive shaft is engaged the flashing of said illumination means is clearly visible, and if the driver succeeds in disengaging said second drive shaft said illumination means then assumes a fixed condition of operation and thereby indicates that said second drive shaft is no longer rotating.

6. The apparatus of claim 5 wherein said fastening means includes a pair of straps.

7. The apparatus of claim 5 wherein said rack is made of metal, and said electric circuit means is connected between said metal rack and the vehicle battery.

8. The apparatus of claim 5 wherein said illumination means is an electric bulb.

9. The apparatus of claim 5 wherein said illumination means is a light emitting diode.

* * * * *